O. B. STEELE.
Pocket-knife and Rule.
No. 77,121.
Patented April 21, 1868.
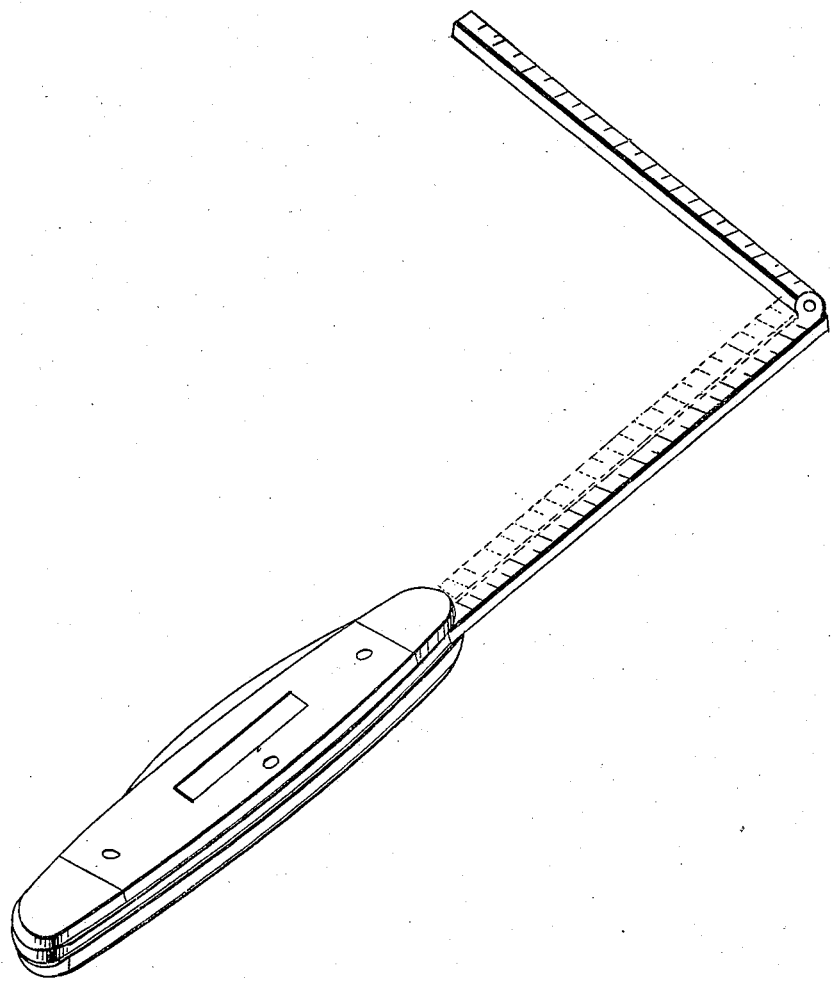

United States Patent Office.

OLIVER B. STEELE, OF FRANKLIN, PENNSYLVANIA.

Letters Patent No. 77,121, dated April 21, 1868.

IMPROVEMENT IN COMBINED RULE AND POCKET-KNIFE.

*The Schedule referred to in these Letters Patent and making part of the same.*

TO ALL WHOM IT MAY CONCERN:

Be it known that I, OLIVER B. STEELE, of Franklin, in the county of Venango, and State of Pennsylvania, have invented a new and improved Combined Rule and Pocket-Knife; and I do hereby declare that the following is a full, clear, and exact description thereof, which will enable those skilled in the art to make and use the same, reference being had to the accompanying drawings forming part of this specification.

This invention consists in placing a measuring-rule in combination with the handle of a pocket-knife, whereby the rule will be conveniently accessible when wanted.

The accompanying drawing represents a perspective view of a knife-handle, A, having blades in the usual manner, as shown at B, and a jointed rule, C D, occupying a place on the blade-rivet of the adjacent blade.

The rule is actuated by a back spring, in a manner identical with the blades of pocket-knives, and shuts into the handle when not required for use, also, in the same manner as the blades of the knife.

The part C is closed upon the part D, as shown by the red outline D′, and both parts are shut down into the handle A, as above described.

This invention will be found generally useful, as a foot rule may be made by jointing four three-inch parts together, so as to fold upon each other in opposite directions.

The rule may be made of bone, ivory, steel, silver, hard rubber, wood, or any other suitable material.

I claim as new, and desire to secure by Letters Patent—

Combining a jointed rule with the handle of a pocket-knife, substantially as and for the purpose shown and described.

OLIVER B. STEELE.

Witnesses:
WM. MURRIN,
EDGAR EATON.